Dec. 14, 1943.  D. E. REED  2,336,805
CLAMPING MEANS FOR MIRROR DEVICES AND THE LIKE
Filed July 6, 1939
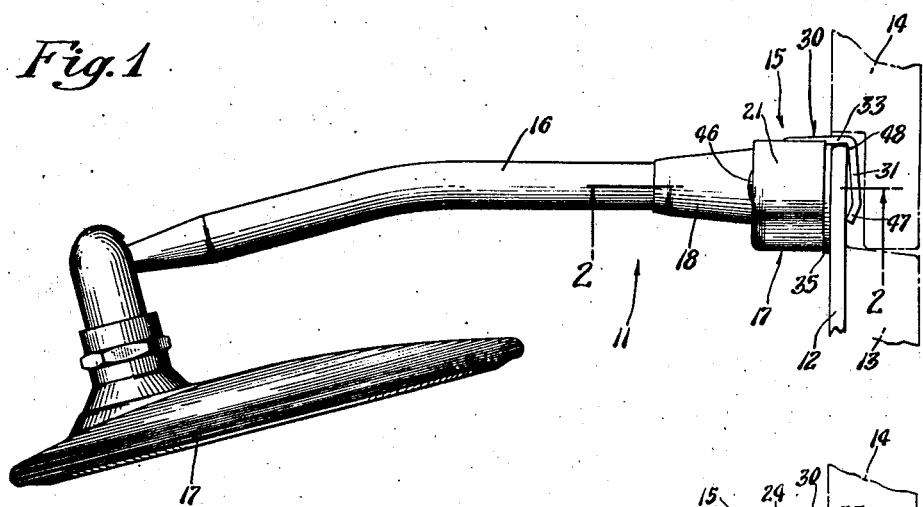
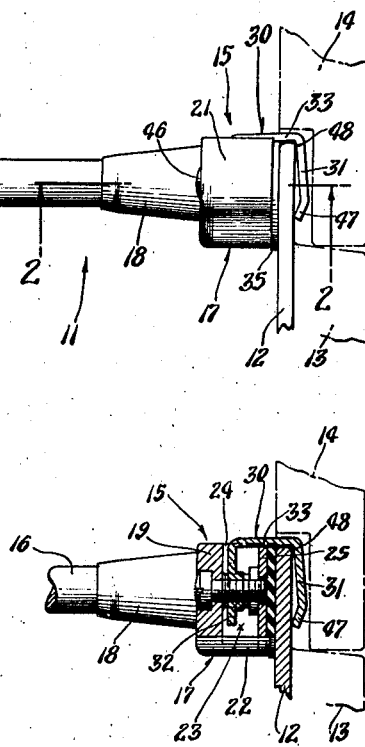
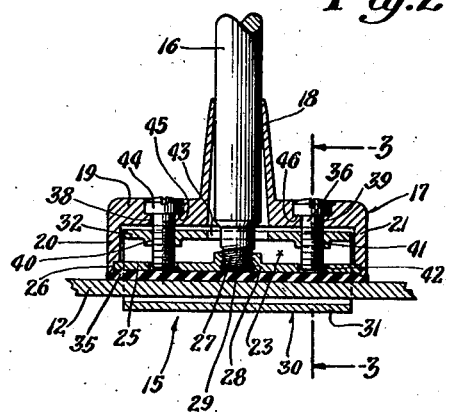
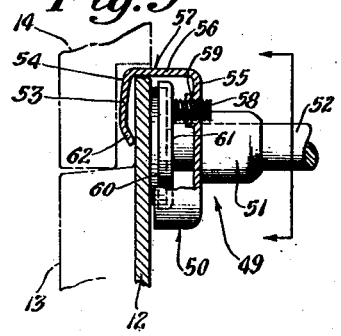
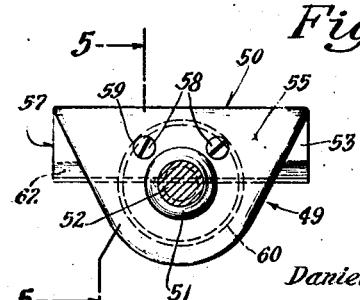
INVENTOR
*Daniel E. Reed*
BY William T. Veyrer
ATTORNEY Patented Dec. 14, 1943

2,336,805

UNITED STATES PATENT OFFICE 2,336,805

CLAMPING MEANS FOR MIRROR DEVICES AND THE LIKE

Daniel E. Reed, Norwalk, Conn., assignor to Yankee Metal Products Corp., Norwalk, Conn., a corporation of New York Application July 6, 1939, Serial No. 283,005

1 Claim. (Cl. 248—226)

This invention relates to a clamping and supporting device, particularly a clamping and supporting device which because of its novel construction is most advantageously adapted to mount a support for a mirror or the like on the conventional flange of an automobile door.

Recognizing the need for providing a rearview mirror auxiliary to the usual rearview mirror positioned within an automobile and adapted to give a better view of objects at the side of and close to the automobile, there heretofore have been proposed a number of different mountings for supporting an auxiliary mirror to extend laterally from the side of the vehicle. One form of mounting which has been widely adopted for this purpose involves a means constructed to clamp on some convenient element on the side of the automobile, usually the flange of the automobile door, and including a U-shaped clamp having associated therewith an outer jaw, usually cushioned, adapted to engage the outside of the door flange and an inner jaw adapted to engage the inside of the door flange.

Mountings of this general character and form have proved to be popular, but experience has shown that in many cases there has been a tendency for the clamps to spring or to become distorted when gripping pressure is applied thereto, thus permitting the clamps to work loose and not to hold the mirror relative to the automobile in the firm and secure manner desired.

It is, therefore, an object of the present invention to provide a mounting for a rearview mirror or the like, which is simple and sturdy in construction, which will be susceptible of being most securely and firmly secured to an automobile, as by clamping on a door flange thereof, and which will substantially overcome the above-described objection to the usual clamp-type mountings now in general use, namely the tendency to vibrate and shift on the door flange.

In attaining the aforementioned object there is provided as a feature of the present invention a mounting of the U-shaped clamp-type in which the effective gripping pressure of the inner jaw against the door flange is maintained away from the heel of the clamp.

Another and related feature of the present invention is the provision of a mounting of the U-shaped clamp-type in which the adverse effect of any springing or distortion of the clamp when gripping pressure is applied thereto is compensated for and substantially overcome by forming the inner clamping jaw with a clawlike hook on its free end which not only will firmly grip the inner side of the door flange at a point spaced laterally from the edge of the flange even should the clamp spring or become distorted, but also will cause the outer clamping jaw to be maintained in substantially uniform surface contact with the outer side of the door flange.

Another object of the present invention is to provide a mounting of the aforementioned type which not only may be most securely and firmly clamped in place, but also which most effectively holds the supporting arm for the device mounted thereon, against vibration.

A further object of the present invention is the provision of a clamp-type mounting which may be most easily and economically assembled and produced.

Other features of the invention, therefore, reside in the provision of means for achieving the aforementioned objects.

Other objects and features will hereinafter appear.

In the drawing:

Figure 1 is a view showing a clamping and supporting device embodying the present invention, clamped to the flange of a vehicle door.

Fig. 2 is a sectional view taken on the line 2—2 of Fig. 1.

Fig. 3 is a sectional view taken on the line 3—3 of Fig. 2.

Fig. 4 is a view looking in the direction of the arrow in Fig. 5, showing a modified form of the present invention.

Fig. 5 is a view partially in section taken on the line 5—5 of Fig. 4.

Before describing the present improvements and mode of operation thereof in detail it should be understood that the invention is not limited to the details of construction and arrangement of parts shown in the accompanying drawing, which are merely illustrative of the present preferred embodiments, since the invention is capable of other embodiments, and the phraseology employed is for the purpose of description and not of limitation.

Referring more particularly to the drawing and first to Figs. 1–3, there is shown a clamping and supporting device 11 embodying the present invention and associated, by way of illustration, with a flange 12 of a conventional automobile door 13 which may be positioned in a usual manner on the side of the main body 14 of the automobile.

As shown, the device includes a U-shaped clamp 15, carrying a supporting member or arm 16 on which a rearview mirror 17 may be secured in any now well known and conventional manner. Many devices of this general type and character have heretofore been proposed and are now in commercial use. However, experience has shown that in a great number of cases these heretofore proposed and used devices have a tendency to vibrate, shift and work loose on the door flange under actual operating conditions.

This disadvantageous result is caused, in large part, by a springing or distortion of the U-shaped clamp when gripping pressure is applied thereto. The clamp, therefore, is not rigidly held on the door flange and with the normal vibration caused by opening and closing the door, the assembly slides laterally on the door flange, resulting in the clamp scraping paint from the automobile body 14 when the door is closed, and ultimately resulting in the clamp jamming against the automobile body in such a way that it is knocked or falls off the door flange.

The clamping and supporting device 11 provided by the present invention and which is particularly adapted to be secured to a door flange in such a way that it may be most rigidly attached to and will not work loose in the manner of devices of the same general character heretofore proposed, includes a base member 17 having an outwardly extending supporting sleeve 18 which, if desired, may be cast integral therewith, and from which outwardly extends the supporting arm 16.

As shown the base member 17 is formed with a main section 19 from which the sleeve 18 extends, and with depending end walls 20 and 21 and a depending side wall 22 defining a chamber 23 with an open side 24 in the base member.

Closing the bottom of the chamber but not the open side 24 is a plate 25 which, if desired, may be formed integral with the base member but which preferably, as shown, is formed as a separate member which is confined against outward and lateral shifting movement by being snugly disposed in a shouldered recess 26 formed in the ends of the depending walls 20, 21 and 22. This plate 25 constitutes an outer clamping jaw.

Of importance, particular attention is directed to the fact that the supporting arm 16 extends inwardly through the sleeve 18 which is internally tapered and at its outer extremity closely confines and laterally supports the supporting arm 16. The inner extremity of the supporting arm is rigidly secured to the plate 25. This rigid connection between the plate 25 and the supporting arm 16 may, as shown, be very advantageously achieved by forming threads 27 on the inner end of the supporting arm and screwing the latter into an internally threaded opening 28 in the plate 25. Solder 29 may be placed in the opening 28 to close the latter and most effectively and rigidly secure the supporting arm therein to the plate 25. With this construction it is seen that the supporting arm is most effectively secured to the clamp 15 and is maintained against vibration relative thereto at two points, namely at the sleeve 18 and the plate 25.

Associated with the base member 17 is a substantially U-shaped member 30, preferably of stainless steel, having inner and outer sections or arm 31 and 32 extending laterally from and spaced by a connecting section 33, positioned to receive the plate 25 therebetween with the outer section or arm 32 being located in the base member chamber 23 and with the inner section or arm 31 providing the inner clamping jaw opposed to the outer clamping jaw 25 which is preferably provided with a cushioning member 35 of rubber or the like adapted to engage the outside of the door flange 12.

For causing relative movement between the outer and inner clamping jaws 25 and 31 so that the door flange may be securely gripped therebetween, there are provided a pair of screws 36 which pass through holes 38 and 39 in the outer or main section 19 of the base member at opposite sides of the sleeve 18 and into threaded holes 40 and 41 formed in the outer section of the U-shaped member 30. Preferably, and as shown, the plate 25 is provided with guide holes 42 to receive and laterally support the screws 36, and the outer section of the U-shaped member is provided with a recess 43 to accommodate the supporting arm 16.

Thus when the screws 36 are turned in one direction the heads 44 of the screws are drawn against shoulders 45 and 46 in the holes 38 and 39 and the inner clamping jaw is drawn toward the outer clamping jaw.

Of particular importance and in order to insure the clamp 15 being held in a most rigid manner on the door flange the free end of the inner clamping jaw is angularly offset to provide a clawlike hook 47 extending toward the outer clamping jaw.

By means of this hook 47 the gripping pressure of the inner jaw is laterally removed from the heel 48 of the clamp so that the adverse effect caused by any springing or distortion of the clamp 15 when gripping pressure is applied thereto, is overcome. Even if the clamp should be slightly sprung or distorted in drawing up the same the projecting clawlike hook 47 still provides effective gripping means laterally spaced from the edge of the door flange and adapted to effectively maintain the outer clamping jaw in substantially uniform and surface contact with the outer side of the door flange. Tests have shown that a clamp provided with the advantageous clawlike gripping hook above described will be maintained in rigid association with the door flange under the most severe operating conditions.

Also preferably, and as shown, to further minimize any tendency of the clamp to spring, and to cause the clamp to grip the door flange in a most effective manner the screws 36 are so located that the longitudinal or force applying axis thereof will be located on a line intermediate the heel or supported end 48 of the clamp and the projecting gripping hook 47 which so advantageously bites into and grips the door flange at a point spaced laterally from the edge thereof.

If desired, and as shown in Figs. 4–5, this same advantageous construction whereby the gripping pressure of the inner clamping jaw is applied at a point spaced laterally from the heel of a clamp, may be embodied in a modified form of clamping and supporting device 49.

This modified device 49 includes a base member 50 having a sleeve 51 extending outwardly therefrom and through which a supporting arm 52 for a mirror or the like extends in longitudinal sliding relation. Unlike the device 11 first described, the modified device is provided with an inner clamping jaw 53 which is formed by a section 54 integral with the base member, this jaw 53 together with the main section 55 of the base and the connecting section 56 providing a substantially U-shaped clamp 57.

Screws 58 passing through threaded holes 59 in the main section 55 of the base member engage the outer side of an outer clamping jaw 60 which is secured to the inner end 61 of the supporting arm. When the screws 58 are turned in one direction the reaction of the same against the outer side of the outer jaw 60 causes relative movement between the latter and the base member and thereby results in the inner and outer clamping jaws being drawn together.

Of importance and as in the form first described, the free end of the inner clamping jaw is angularly offset to provide a clawlike hook 62 projecting toward the outer jaw. The same advantageous distribution of gripping pressure achieved in the form of the invention first described is thus also achieved in this modified form of the invention.

Variations and modifications may be made within the scope of this invention and portions of the improvements may be used without others.

Having thus described the invention, what is claimed as new is:

In a device of the character described, a base member having a chamber with an open inner side; an outer clamping jaw, providing a closure for said inner side; means on said base member for arresting outward and lateral movements of said outer jaw; a sleeve portion extending outwardly from said base member; a supporting arm, secured to said outer jaw and extending outwardly from said base member through said sleeve to be laterally supported thereby; an inner clamping jaw opposed to and cooperable with said outer jaw; and means for drawing said inner jaw toward said outer jaw.

DANIEL E. REED.